United States Patent
Sapek et al.

(10) Patent No.: US 8,340,106 B2
(45) Date of Patent: Dec. 25, 2012

(54) CONNECTING MULTI-HOP MESH NETWORKS USING MAC BRIDGE

(75) Inventors: Adam Sapek, Redmond, WA (US); Thiruvengadam Venketesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 661 days.

(21) Appl. No.: 11/375,292

(22) Filed: Mar. 13, 2006

(65) Prior Publication Data

US 2007/0211736 A1    Sep. 13, 2007

(51) Int. Cl.
*H04L 12/66* (2006.01)
*H04L 12/28* (2006.01)

(52) U.S. Cl. .... 370/401; 370/352; 370/392; 370/395.31

(58) Field of Classification Search .................. 370/401, 370/85

See application file for complete search history.

(56) References Cited

U.S. PATENT DOCUMENTS

| | | | | |
|---|---|---|---|---|
| 4,922,503 | A * | 5/1990 | Leone | 370/402 |
| 5,323,394 | A * | 6/1994 | Perlman | 370/238 |
| 2003/0157951 | A1 | 8/2003 | Hasty, Jr. | 455/519 |
| 2004/0105440 | A1* | 6/2004 | Strachan et al. | 370/389 |
| 2004/0165600 | A1 | 8/2004 | Lee | 370/395.53 |
| 2005/0220096 | A1 | 10/2005 | Friskney et al. | 370/389 |
| 2006/0146846 | A1* | 7/2006 | Yarvis et al. | 370/406 |
| 2007/0091871 | A1* | 4/2007 | Taha | 370/352 |
| 2009/0052374 | A1 | 2/2009 | Takeda et al. | 370/328 |

FOREIGN PATENT DOCUMENTS

| | | |
|---|---|---|
| EP | 1 533 953 | 5/2005 |
| JP | 2002-374279 | 12/2002 |
| JP | 2006-311495 | 11/2006 |
| WO | WO 02/078272 A1 | 10/2002 |
| WO | WO 03/069855 | 8/2003 |

OTHER PUBLICATIONS

Ohsawa et al.; "Bridging Functionality for Medium Access Control Sublayer"; pp. 880-884; 5th IEEE International Symposium on, vol. 3, Sep. 18-23, 1994.

Mingkhwan et al.; "Multi Hop Communication in Global Wireless framework"; Mar. 16-20, 2003; pp. 1011-1016 vol. 2.

Office Action mailed Feb. 11, 2011, issued in Russian Pat. Application No. 2008136890, w/Translation.

(Continued)

*Primary Examiner* — John Blanton
*Assistant Examiner* — Thinh Tran
(74) *Attorney, Agent, or Firm* — Merchant & Gould

(57) ABSTRACT

A multi-hop mesh network may be connected to a Local Area Network (LAN) using a MAC Bridge. One or more nodes on the mesh network may be configured as a bridge node that employs a MAC bridge. Packets that travel between stations on the LAN to nodes on the mesh network flow through one of the bridge nodes on the mesh network. The bridge nodes do not receive all the packets on mesh network, but they receive the packets that are to be transmitted across the MAC bridge. As the bridge nodes learn of new stations on the LAN they advertise routes to the other nodes within the mesh network specifying how to reach those stations. This enables MAC Bridge functionality between wireless mesh networks and 802 LANs.

20 Claims, 5 Drawing Sheets

OTHER PUBLICATIONS

Office Action dated Nov. 12, 2010, issued in CN Application No. 200780009344.7, w/translation.

Akyildiz, I., et al.; *"Wireless mesh networks: a survey"*; Computer Networks; 2005; www.sciencedirect.com; 10 pgs.

Search Report dated Nov. 23, 2010, in EP Application No. 07 71 7231.

Office Action dated Sep. 16, 2011, issued in JP Application No. 2009-500358, w/Translation.

Office Action dated Jan. 4, 2012, issued in IL Application No. 193564, w/translation.

Office Action dated Mar. 26, 2012, issued in CN Application No. 200780009344.7, w/translation.

Office Action dated Jun. 6, 2001, issued in MX Application No. MX/a/2008/011657.

* cited by examiner

CONNECTING MULTI-HOP MESH NETWORKS USING MAC BRIDGE

BACKGROUND

Local Area Networks (LANs) may be connected together using MAC (Media Access Control) Bridges. The bridged LANs make it appear to stations that they are attached to a single LAN, even when they are attached to separate LANs each with their own MAC. A MAC Bridge operates below the MAC Service Boundary, and the communications between the stations are transparent to the logical link control (LLC) and network layer protocols, just as if the stations were attached to the same LAN. MAC Bridges depend on a Bridge Port to receive all packets transmitted on the network. Nodes in a multi-hop wireless mesh network, however, don't receive all of the transmitted packets. Packets on a multi-hop wireless mesh network are only visible to a limited number of nodes on the path to the destination.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A multi-hop mesh network may be connected to a LAN using a MAC Bridge. One or more nodes on the mesh network may be configured as a MAC bridge node. Packets that travel between stations on the LAN and nodes on the mesh network flow through one of the bridge nodes on the mesh network. Bridge nodes do not receive all the packets on mesh network, but they receive the packets that are to be transmitted across the MAC Bridge. As the bridge nodes learn of new stations on the LAN they advertise routes to the other nodes within the mesh network specifying how to reach those stations. This enables MAC Bridge functionality between wireless mesh networks and LANs.

DETAILED DESCRIPTION

Figure 1:
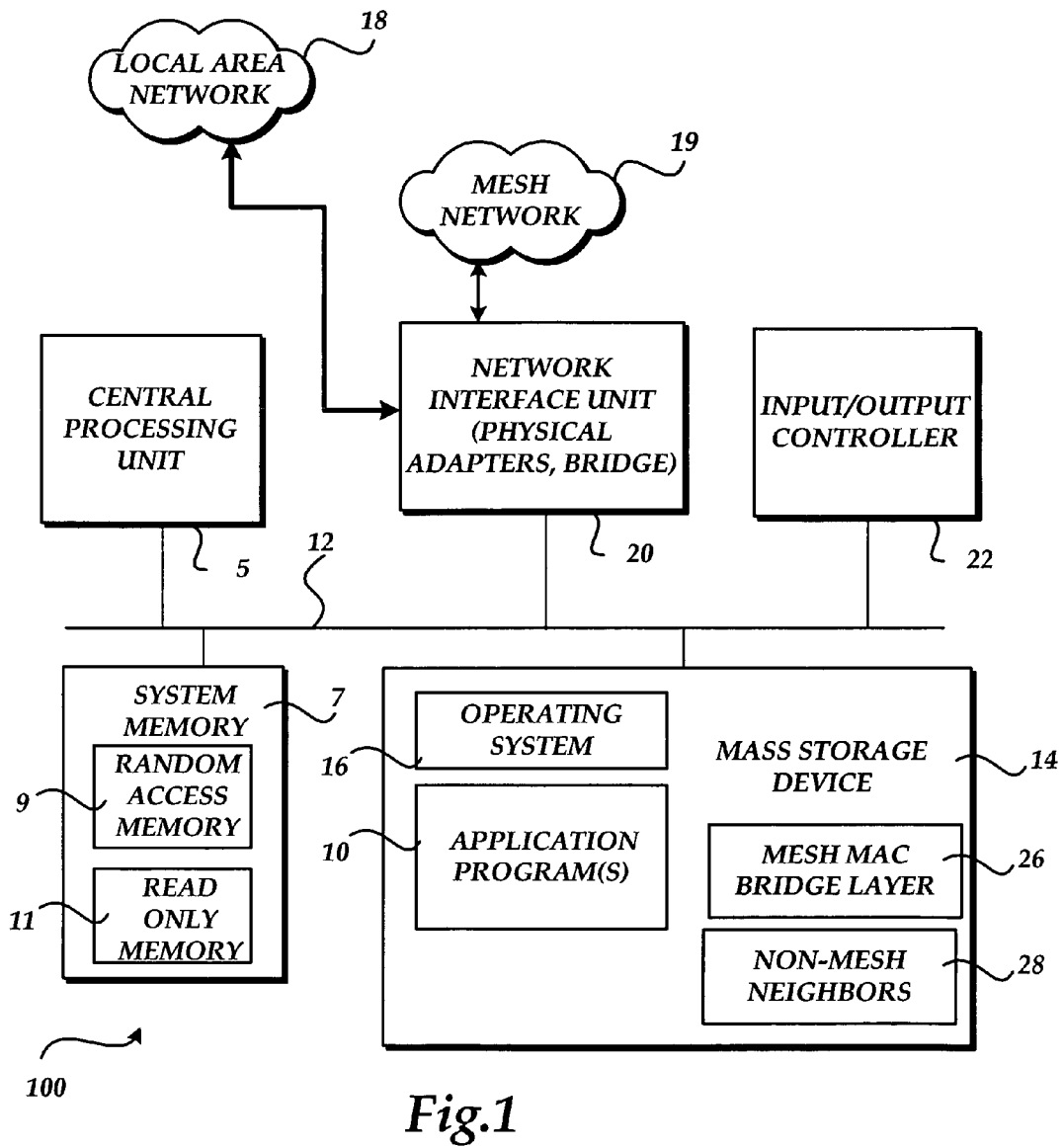
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a node within a mesh network, a station within a Local Area Network, a desktop or mobile computer, and the like. As illustrated computer 100 includes a central processing unit 5 ("CPU"), a system memory 7, including a random access memory 9 ("RAM")) and a read-only memory ("ROM")) 11, and a system bus 12 that couples the memory to the CPU 5. A basic input/output system containing the basic routines that help to transfer information between elements within the computer, such as during startup, is stored in the ROM 11. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD")), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through one or more networks, such as LAN 18 and mesh network 19. The computer 100 may connect to the networks through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store one or more application programs 10. According to embodiments, computer 100 includes a mesh MAC bridge layer 26 that is configured to couple nodes on mesh network 19 with stations on LAN 18. Briefly described, when computer 100 is configured as a bridge node on mesh network 19 packets that travel between stations on the LAN 18 and nodes on the mesh network 19 flow through mesh MAC bridge layer 26. The computer 100 acting as a bridge node does not receive all the packets on mesh network 19, but it receives the packets that are to be transmitted across the MAC Bridge between LAN 18 and mesh network 19. As the mesh MAC bridge layer 26 learns of new stations on the LAN 18 it advertises a route(s) to the other nodes within the mesh network 19 specifying how to reach those stations. A list of non-mesh neighbors 28 may also be maintained to keep track of the known stations on a LAN. This enables MAC Bridge functionality between wireless multi-hop mesh networks and 802 LANs.

Figure 2:
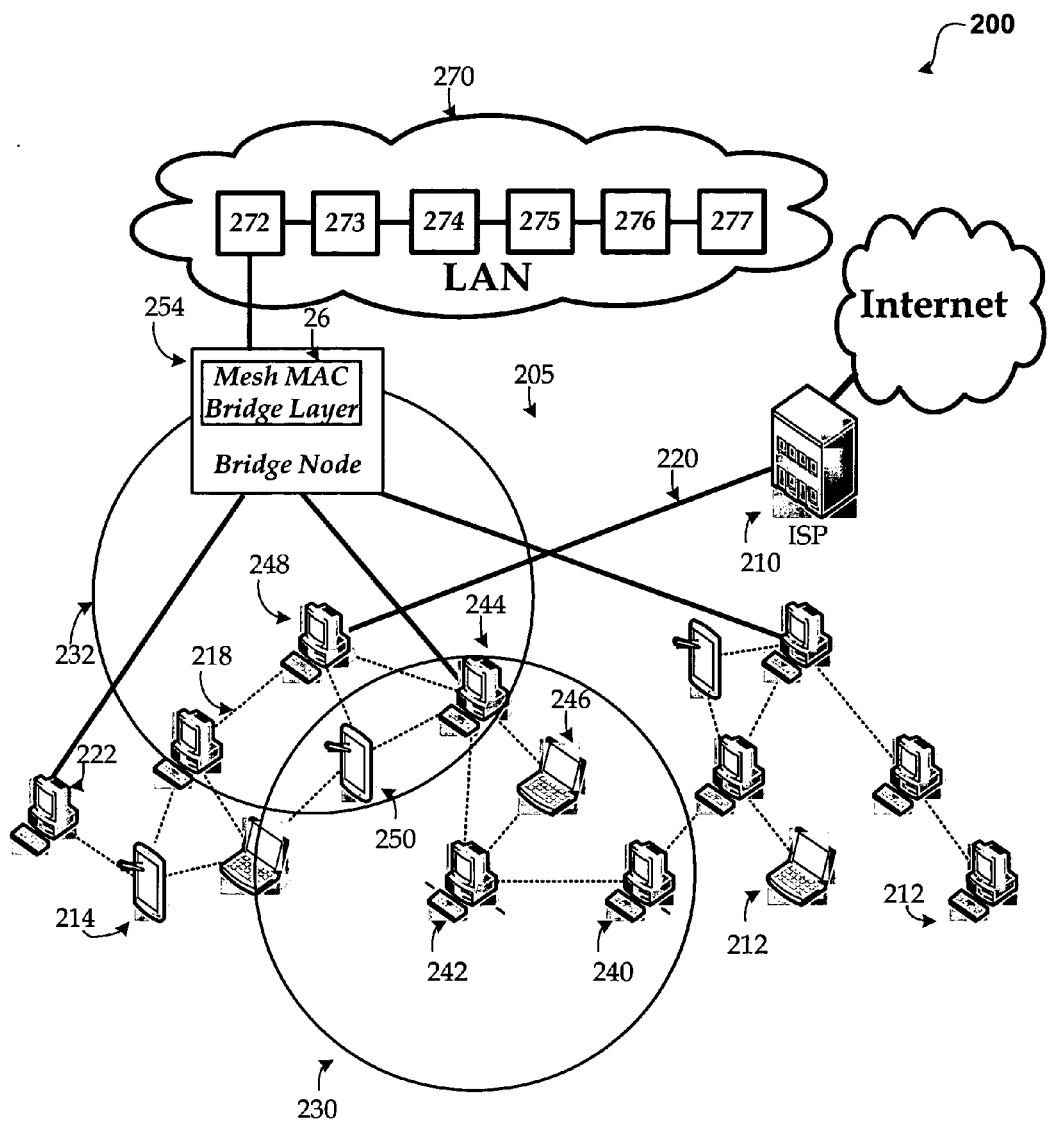
FIG. 2 illustrates a MAC bridging system for a mesh network.

FIG. 2 illustrates a MAC bridging system 200 for a mesh network. As illustrated, MAC system 200 includes an exemplary mesh network coupled to a LAN using a MAC bridge node. Mesh network 205 may comprise any topology of mesh nodes, Internet service providers, and communication media. Also, the mesh network 205 may have a static or dynamic topology.

The mesh network 205 may include zero or more Internet service providers 210, which provide Internet access points for one or more mesh nodes. Each mesh node may comprise any device that is connected to the mesh network 205. The mesh nodes may transmit and receive data packets and also may pass data packets to other mesh nodes in accordance with the routing protocol of the mesh network 205. The mesh nodes may be a fixed device or a mobile device. For example, the mesh node may include a computing device 212 that is similar to computing device 100 described above in conjunction with FIG. 1. The mesh node may also include a mobile computing device 214. Other embodiments may include other configurations of mesh nodes.

According to one embodiment, the mesh network 205 has a network topology in which mesh nodes are connected with several redundant connections between the mesh nodes. The mesh network 205 may include a full mesh where every mesh node is connected to every other mesh node in the mesh network. Mesh network 205 may also include a partial mesh topology where some mesh nodes are organized in a full mesh and other mesh nodes are only connected to one or two other mesh nodes. Other mesh topologies may include one or more client subnets connected to the mesh network. These client subnets may have a plurality of clients connected thereto. The various topologies for the mesh network 205 are endless and will not be further set forth herein.

One or more of the mesh nodes may be configured as a bridge node 254. As illustrated in system 200, packets that are transmitted between LAN 270 and mesh network 205 flow through bridge node 254. Bridge node 254 provides the functionality of a MAC Bridge such that MAC Bridge functionality is provided between wireless mesh network 205 and 802 LAN 270. Each mesh node within mesh network 205 routes all packets that are directed to one of the stations (272-277) through bridge node 254. When bridge node 254 receives a packet directed to LAN 270, the mesh MAC bridge layer 26 forwards the packet to the appropriate location. Whenever the bridge node 254 learns of a new station on the LAN it advertises a route to the other nodes on the mesh network 205. The advertised route is to bridge node 254 such that the bridge node may forward the packets to the appropriate station on the LAN 270. Additionally, any packets received by a station on LAN 270 are forwarded to the appropriate node on mesh network 205.

Reference number 218 indicates communication media between the mesh nodes. By way of example, and not limitation, communication media 218 may include wired media such as a wired network or direct-wired connection, and wireless media such as acoustic, RF, infrared and other wireless media. Reference number 220 indicates communication media between Internet service provider 210 and one or more of the mesh nodes. The communication media 220 may include wired media such as a wired network or direct-wired connection, and wireless media such as acoustic, RF, infrared and other wireless media. The nodes may be configured to self-form a wireless network with other nodes within a particular range.

As discussed above, each node that is configured as a bridge node (e.g. bridge node 254) transmits and receives packets to and from the LANs (270) to which it is attached. To illustrate the functionality of a MAC Bridge between multi-hop mesh network 205 and 802 LAN 270 an example of sending a unicast IP (Internet Protocol) packet from node 248 to station 274 is provided. The example is merely for illustrative purposes and is not intended to be limiting.

Node 248 starts with the IP address of station 274. The IP address may be provided by a user, obtained through name resolution, and the like. Before sending the packet, node 248 first resolves the MAC address of station 274. Node 248 sends an ARP (Address Resolution Protocol) request using a broadcast packet and it is delivered to all of the nodes on mesh 205, including the bridge node 254. Bridge node 254 receives the ARP request and indicates it to the MAC Bridge driver (see reference 320 in FIG. 3). The MAC Bridge on node 254 forwards the packet to LAN 270.

Station 274 receives the ARP request and sends an ARP response to node 248. The ARP response is received by bridge node 254 that is coupled to LAN 270 and the bridge node 254 forwards the ARP response to node 248 on the mesh. When bridge node 254 receives the ARP response, the MESH MAC bridge layer 26 processes the packet containing ARP response and extracts station 274's MAC address (e.g. MAC1) from the source address field of Ethernet header of the packet. Since this address is not currently stored by bridge node 254, the address is stored at the bridge node 254. The bridge node 254 then advertises to the other nodes on the mesh network 205 that it knows the route to address MAC1 that is associated with station 274 on LAN 270.

Node 248 receives the advertisement from the bridge node 254 and stores the address. Node 248 receives the ARP response from station 274 and now it knows that the MAC address of station 274 is MAC1. To send a unicast packet to address MAC1, node 248 first resolves the mesh route. Since the route has been advertised by bridge node 254, node 248 knows the mesh route to reach the MAC1 address is through bridge node 254. Knowing the route, node 248 sends a multi-hop mesh packet to node 254.

Bridge node 254 receives the packet and recognizes that it is addressed to a station on the bridged LAN so it indicates the packet to the MAC Bridge layer. The MAC Bridge Layer 26 forwards the packet to LAN 270 and station 274 receives the packet. Although the above example used ARP packets, ARP packets are just one example and these may be substituted by any other packets sent between the nodes and stations.

Figure 3:
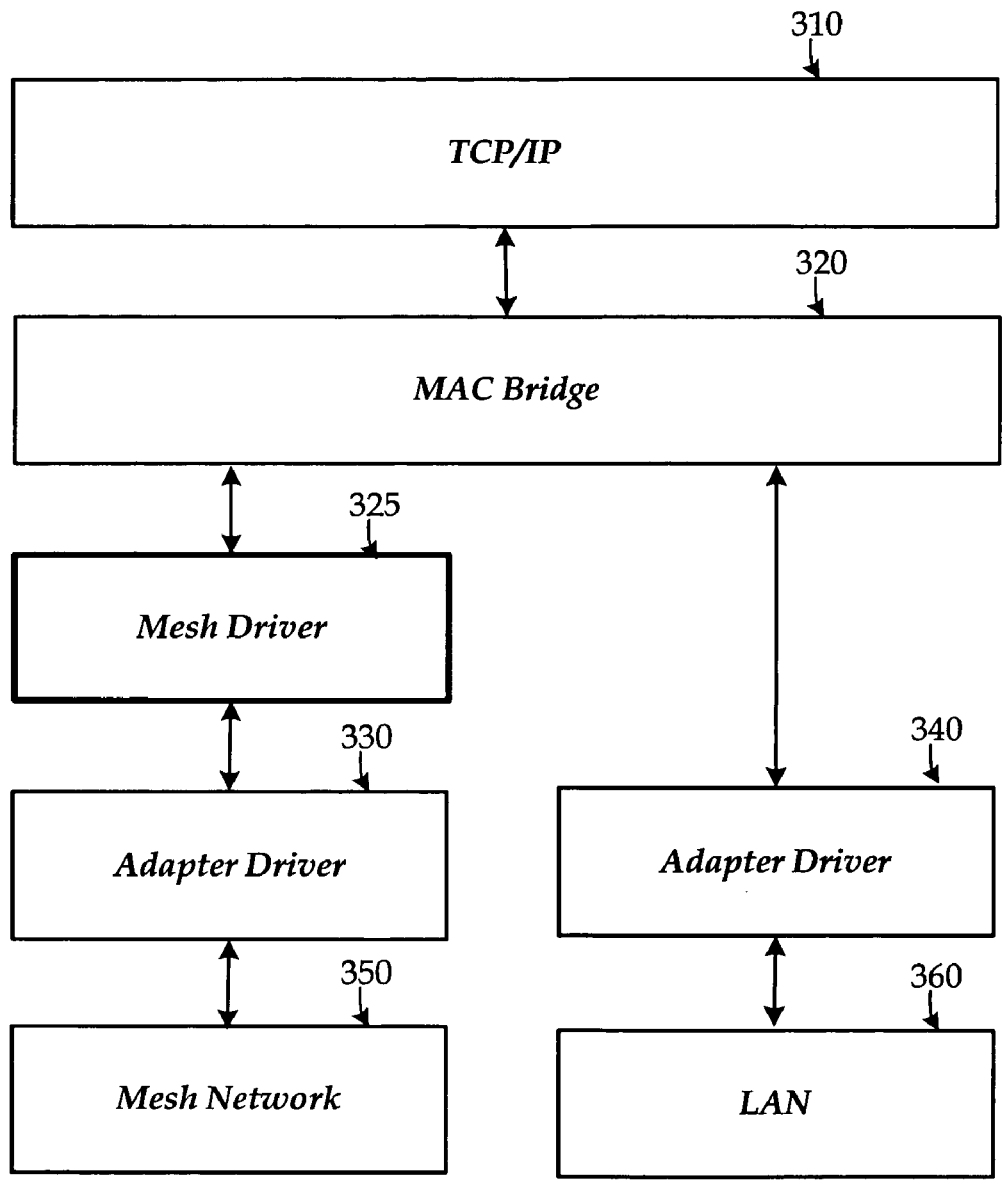
FIG. 3 shows a portion of a network stack on a node acting as a bridge between a multi-hop mesh network and a LAN.

FIG. 3 shows a portion of a network stack on a node acting as a bridge between a multi-hop mesh network and a LAN. As illustrated, FIG. 3 includes network protocol 310 (e.g. TCP/IP), MAC Bridge 320, mesh driver 325, adapter drivers 330 and 340, mesh network 350 and LAN 360. Network stack may be implemented on bridge node 254 as illustrated in FIG. 2. Without including mesh driver 325 the network stack would provide standard MAC Bridge functionality. Generally, standard MAC Bridge requires that both adapters connected to the bridge are in promiscuous mode. In other words, each connected adapter is configured to receive all packets, even those packets that are not addressed to them. In standard MAC Bridge functionality, any received packet is indicated up the stack to MAC Bridge driver 320. The MAC Bridge 320 examines the address to which the packet was sent. When the address is that of the local node, MAC Bridge 320 indicates the packet up the stack to network protocol 310 (e.g. TCP/IP). Otherwise, when the address is not of the local node, then MAC Bridge 320 takes the packet and sends it down the stack using the other adapter connected to the bridge. In this way the packet is delivered to the other network that is bridged to the node. This process happens symmetrically on both adapters. The result is that the two networks are bridged because any packet sent from a first network is resent by the MAC bridge 320 to the second network and vise versa.

As discussed herein, standard MAC Bridge functionality depends on the adapters being in promiscuous mode. This requirement, however, is not always possible. For example, it may not be possible on a standard wireless network when security is used. Even if an adapter can receive a packet addressed to somebody else, it won't be able to decrypt it because only destination of the packet has proper key to decrypt the packet. Furthermore, promiscuous mode is not possible on a wireless mesh network because mesh networks spans an area larger than an RF signal can cover. Therefore, every node can not listen to all of the packets transmitted on mesh network.

In order to bridge a mesh network 350 with a LAN 360 using standard MAC Bridge functionality, a mesh driver 325 included within network stack must provide special handling to enable bridging. As discussed above, all packets that are sent from a node on mesh network 350 to a station on wired network 360 are sent to the mesh node that is acting as the bridge node. Upon receiving a packet from mesh network 350 that is addressed to a station on the wired network 360 the packet is moved up the stack through mesh driver 325 to MAC Bridge 320. As shown on net stack diagram, the mesh driver 325 sits between a wireless network adapter 330 and MAC Bridge driver 320.

Mesh driver 325 checks the Ethernet source address of packets that are being sent. If the address is not an address of the local node then it is an address of a station on network 360 that is located on the other side of MAC bridge 320. In this way, the node on the mesh network that is implementing MAC Bridge 320 and includes mesh driver 325 learns about the addresses of stations on the other side of the bridge on network 360. When an address of a station on network 360 is determined, then that address may be stored in a list of non-mesh neighbors. The addresses of the stations on the other side of the bridge may be communicated to the other nodes on the mesh network in a variety of ways.

According to one embodiment, the other nodes on the mesh network are informed that the stations on network 360 are actually on the mesh network and those stations may be reached through the bridge node. Different mesh implementations may use different mechanisms to tell other mesh nodes about routes to the bridge node. Proactive mesh routing protocols, such as MICROSOFT CORPORATION'S LQSR protocol, may have all nodes distribute a list of their neighbors. Reactive mesh routing protocols may have nodes look for a route to destination when it needs to reach it. As an example, in LQSR, the stations on LAN network are treated as neighbors of the bridge node. When other mesh nodes need to find a route to any of those stations, they would find a route that goes through the bridge node (e.g. a route through node 254 in FIG. 2). When a packet is received from mesh network 350 that is addressed to a station on network 360, mesh driver 325 moves them up the stack to MAC Bridge driver 320. Utilizing this approach, only the bridge node acts differently within the mesh. The other nodes send packets and find routes using standard mesh mechanisms which can very between mesh implementations.

According to another embodiment, the other mesh nodes on mesh network 350 are told that those stations discovered are special addresses that can be reached through the bridge node even though the stations are not actually part of the mesh network 350. Using this approach, any mesh node that is sending a packet to a station on network 360 knows that the stations are to be treated differently from mesh nodes and that the stations are reachable through a bridge node. According to this embodiment, the packet includes two destination addresses. The first destination is an address on the mesh (e.g. bridge node 254 in FIG. 2). This is the address used to discover the route on the mesh. The second address is the final destination of the packet which is an address on network 360. When the bridging node receives the packet from mesh network 350, mesh driver 325 puts the final destination address in the Ethernet destination address field and indicates the packet up the stack to MAC Bridge driver 320.

Figure 4:
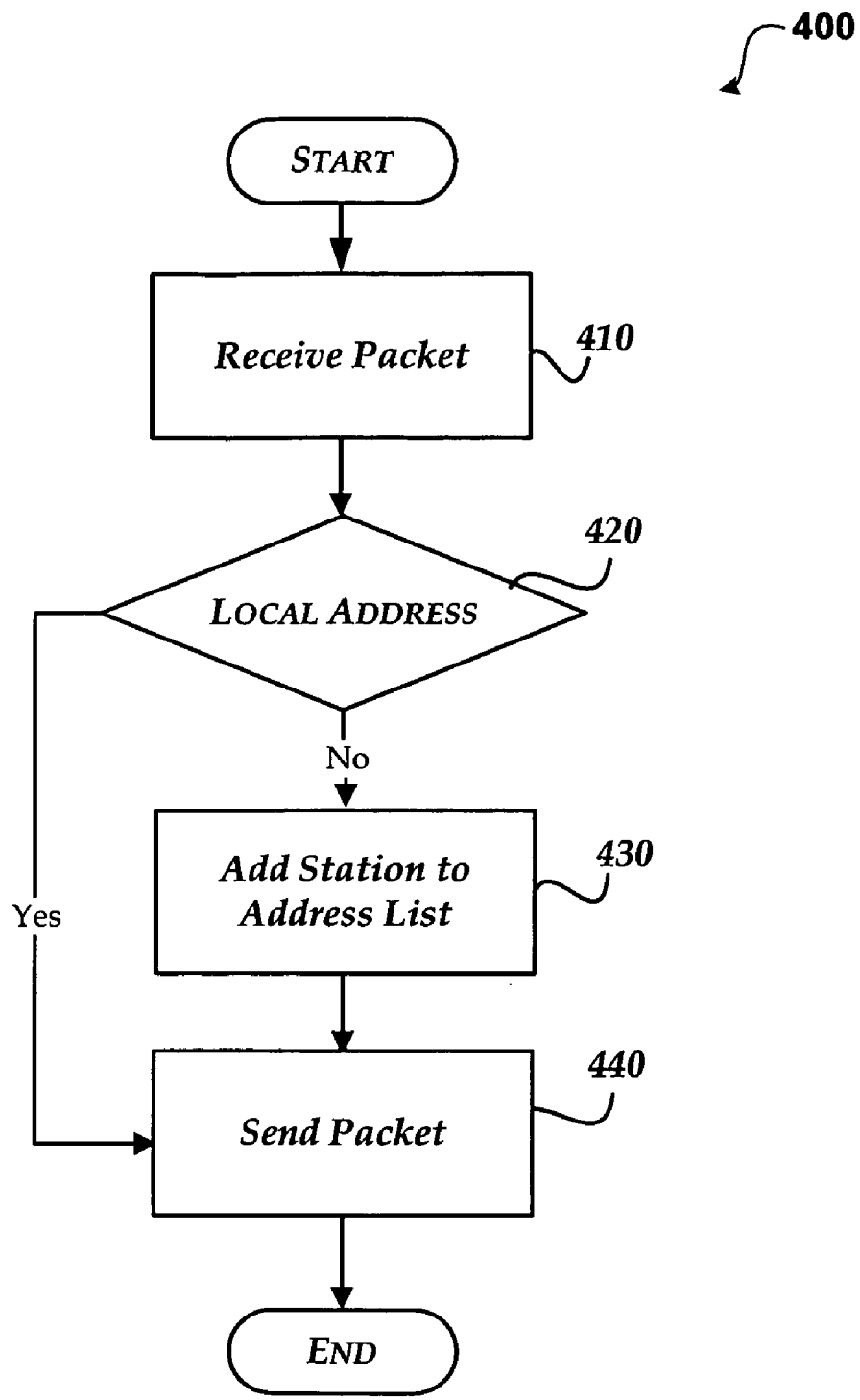
FIG. 4 shows a process implemented by a mesh driver for handling packets to be sent using adapter bound to the mesh driver.

Referring now to FIGS. 3 and 4, an illustrative process for connecting multi-hop mesh networks using MAC Bridge will be described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 4 shows a process 400 implemented by a mesh driver for handling packets to be sent using adapter bound to the mesh driver After a start operation, the process flows to operation 410 where mesh driver receives from upper edge of the protocol stack a packet to be sent.

Moving to decision operation 420, a determination is made as to whether the source address in the packet is a local address of the bridge node.

When the address is not a local address then the process moves to operation 430 and the address of the station is added to an address list that includes addresses of all identified non-mesh nodes. According to one embodiment, the address list contains the addresses of stations that are outside of the mesh-network and that have communicated with the bridge node. The list may be updated when a new station is determined and/or upon the passing of some expiration period. For example, a station may be removed from the list when the bridge node has not received any packets that are associated with that station for a predetermined period of time.

The process flows to operation 440 where the packet is sent using network adapter (330 on FIG. 3). The process then steps to an end operation and continues processing other actions.

Figure 5:
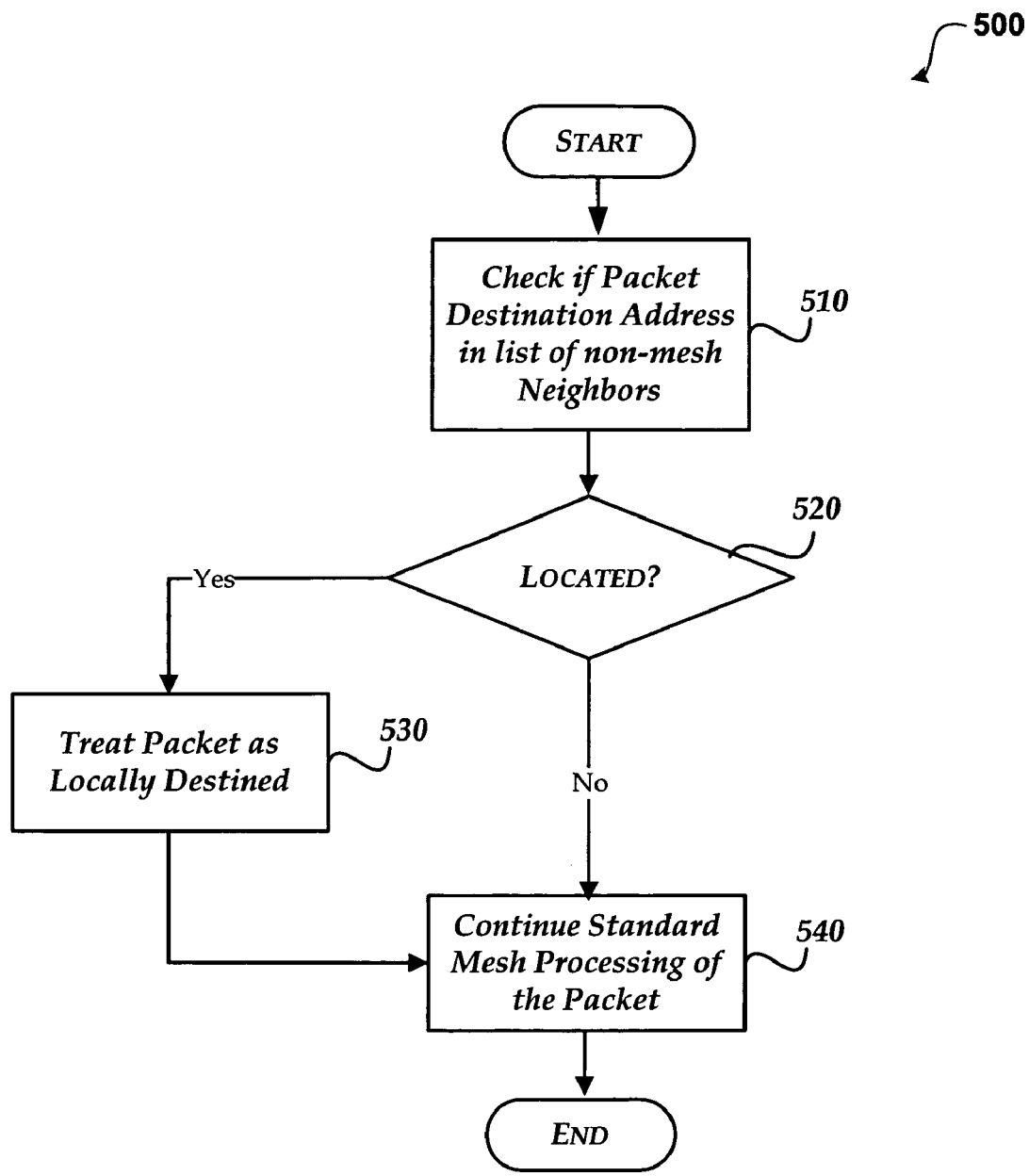
FIG. 5 illustrates a process implemented by mesh driver for handling for packets received on network adapter.

FIG. 5 illustrates a process 500 implemented by mesh driver (325 on FIG. 3) for handling for packets received on network adapter (330 on FIG. 3).

After a start operation, the process flows to operation 510 where mesh driver compares destination of the packet with the list of non-mesh neighbors (see 0038) Flowing to decision operation 520, if the packet destination is on the list of non-mesh neighbors, then the process flows to operation 530 where the packet is treated as a locally destined packet, otherwise the packet is handled using the standard receiving process (540). The process then steps to an end operation and continues processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for connecting a mesh network to a LAN using a standard MAC Bridge, comprising:
    determining addresses of stations on the LAN using a bridge node; wherein the bridge node comprises a mesh driver that is located between a MAC bridge layer and a wireless adapter that is coupled wirelessly to the mesh network; wherein upon receiving a packet at the wireless adapter from the mesh network, the mesh driver: checks an address of the packet; determines when the address is a local node on the mesh network without accessing the MAC Bridger layer;
    determines when the address is not an address of a local node and only when the address is not the address of the local node on the mesh network then the mesh driver moves the packet up to the MAC Bridge layer and stores the address as a LAN station within a list of non-mesh neighbors that have communicated with the bridge node and removing one of the stations from the list when the bridge node has not received any packets that are associated with the one of the stations for a predetermined period of time;
    proactively advertising each of the determined addresses of the LAN stations to other nodes within the mesh network comprising non-bridge nodes as being a mesh neighbor of the bridge node regardless of the need for a route; and
    directing packets from nodes on the mesh network destined to stations on the LAN through the bridge node.

2. The method of claim 1, wherein determining the addresses of stations on the LAN using a bridge node comprises examining addresses associated with a packet sent to the mesh network from the bridge node.

3. The method of claim 2, wherein a source address associated with the packet is identified as an address of a station on the LAN when the address is not a local address of the bridge node.

4. The method of claim 3, wherein the list is updated when a new LAN station is determined.

5. The method of claim 4, further comprising the bridge node advertising to other nodes on the mesh network mesh routes that can be used to reach the LAN stations within the list.

6. The method of claim 4, further comprising bridge node advertising the LAN stations within the list as neighbors of the bridge node.

7. The method of claim 6, further comprising marking the neighbors as special neighbors not on the mesh but reachable through the bridge node.

8. A computer-readable memory having computer executable instructions for connecting a mesh network to a LAN using a standard MAC Bridge, comprising:
    determining addresses of stations on the LAN from the mesh network;
    proactively advertising each of the determined addresses of the LAN stations to other nodes within the mesh network comprising non-bridge nodes as being a mesh neighbor of a bridge node on the mesh network; wherein the advertisement is performed using a proactive mesh routing protocol such that the advertisement occurs regardless of whether or not a need for a route exists, and
    directing packets from nodes on the mesh network destined to stations on the LAN through a bridge node on the mesh network; wherein the bridge node comprises a mesh driver that is located between a MAC bridge layer and a wireless adapter that is coupled wirelessly to the mesh network; wherein upon receiving a packet from the mesh network, the mesh driver checks an address of the packet and when the address is not an address of a local node on the mesh network, only then the mesh driver moves the packet up to the MAC Bridge layer and otherwise not moving the packet up to the MAC Bridge layer and not accessing MAC bridge layer when the address is an address of a local node on the mesh network and storing the address as a LAN station within a list of non-mesh neighbors that have communicated with the bridge node and removing one of the stations from the list when the bridge node has not received any packets that are associated with the one of the stations for a predetermined period of time.

9. The computer-readable memory of claim 8, wherein determining the addresses of stations on the LAN from the mesh network comprises examining addresses associated with a packet sent to the mesh network.

10. The computer-readable memory of claim 9, wherein a source address associated with the packet is identified as an address of a station on the LAN when the address is not a local address of the bridge node.

11. The computer-readable memory of claim 10, wherein the list is updated when a new LAN station is determined.

12. The computer-readable memory of claim 11, further comprising advertising to other nodes on the mesh network mesh routes that can be used to reach the LAN stations within the list.

13. The computer-readable memory of claim 11, further comprising advertising the LAN stations within the list as neighbors of the bridge node.

14. The computer-readable memory of claim 13, further comprising marking the neighbors on the LAN as special neighbors as not on the mesh but reachable through the bridge node.

15. An apparatus for connecting a mesh network to a LAN using a standard MAC Bridge, comprising:
    a processor and a computer-readable storage medium;
    an operating environment stored on the computer-readable storage medium and executing on the processor and that is configured to interact with;
    a standard MAC bridge;
    a LAN adapter driver that is coupled to the MAC bridge and that is coupled to the LAN; and
    a mesh driver that is coupled to the MAC bridge and that is coupled to a mesh adapter driver that is connected to the mesh network; directing packets from nodes on the mesh network destined to stations on the LAN through a bridge node on the mesh network; wherein the mesh driver that is located between the MAC bridge prevents local packets from being moved to the MAC bridge and a wireless adapter that is coupled wirelessly to the mesh network; and wherein the mesh driver is configured to determine addresses of stations on the LAN; use functionality of the MAC bridge only when an address is non-local, proactively advertise each of the determined addresses of the LAN stations to other nodes within the mesh network comprising non-bridge nodes as being a mesh neighbor of the apparatus regardless of a need for a route; and direct packets from nodes on the mesh network destined to stations on the LAN and store the address as a LAN station within a list of non-mesh neighbors that have communicated with the bridge node and updating the list after the passing of a predetermined period of time.

16. The apparatus of claim 15, wherein determining the addresses of stations on the LAN from the mesh network comprises examining addresses associated with a packet sent to the mesh network.

17. The apparatus of claim 16, wherein a source address associated with the packet is identified as an address of a station on the LAN when the address is not a local address of the bridge node.

18. The apparatus of claim 17, wherein the list is updated when a new LAN station is determined.

19. The apparatus of claim 18, further comprising performing at least one of: advertising to other nodes on the mesh network mesh routes that can be used to reach the LAN stations within the list and advertising the LAN stations within the list as neighbors of the bridge node.

20. The apparatus of claim 19, further comprising marking the neighbors on the LAN as special neighbors as not on the mesh.

* * * * *